Figure 5:
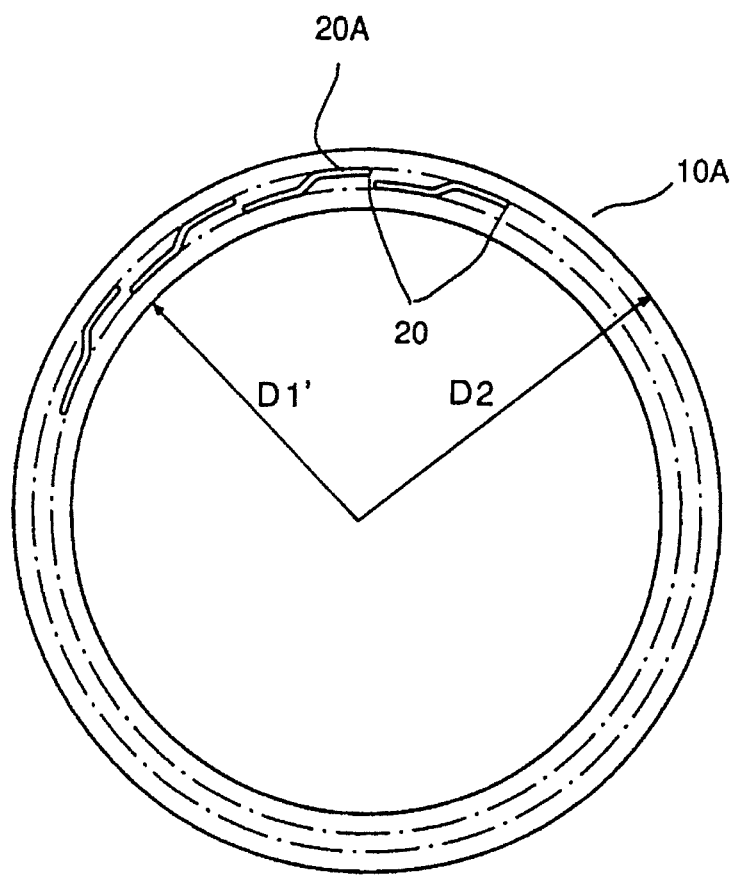

United States Patent

Brandstetter et al.

[11] Patent Number: 5,520,353
[45] Date of Patent: May 28, 1996

[54] WINDING HUB DEVICE FOR TAPES

[75] Inventors: Hermann Brandstetter; August Liepold; Hartmut Thiele; José Toral, all of Munich; Gottfried Lutz, Seefeld, all of Germany

[73] Assignee: BASF Magnetics GmbH, Mannheim, Germany

[21] Appl. No.: 243,991

[22] Filed: May 18, 1994

[30] Foreign Application Priority Data

May 25, 1993 [DE] Germany .............................. 9307867 U

[51] Int. Cl.⁶ .................................................. B65H 18/08
[52] U.S. Cl. ..................................... 242/530.3; 242/571.4; 242/613
[58] Field of Search ........................... 242/530, 530.3, 242/571, 571.4, 571.5, 118.1, 118.2, 613

[56] References Cited

U.S. PATENT DOCUMENTS

| | | | |
|---|---|---|---|
| 3,322,361 | 5/1967 | Young | 242/530.3 |
| 3,550,872 | 12/1970 | Porterfield | 242/613 |
| 3,946,962 | 3/1976 | Deletzke, Jr. | 242/571.4 |
| 3,999,721 | 12/1976 | DuFresne | 242/571.5 |
| 4,109,878 | 8/1978 | Osawa | 242/571.4 |
| 4,139,165 | 2/1979 | Dyck | 242/530.3 |
| 4,198,066 | 4/1980 | Deprez et al. | 242/530.3 |
| 4,438,888 | 3/1984 | Seelinger | 242/530.3 |
| 4,760,972 | 8/1988 | Sasaki et al. | 242/613 |
| 4,923,137 | 5/1990 | Jorgensen et al. | 242/613 |
| 5,257,749 | 11/1993 | Liepold et al. | 242/571.4 |

*Primary Examiner*—John P. Darling
*Attorney, Agent, or Firm*—Keil & Weinkauf

[57] ABSTRACT

A ring part and individual winding hub combination comprises a single-flange ring part with or without spring elements on the receiving circumference for the internal bore of the associated winding hub, which has or does not have spring elements between the internal bore and outer circumference. Receiving circumferential rim and internal bore may expediently be designed with intermeshing toothings.

11 Claims, 5 Drawing Sheets

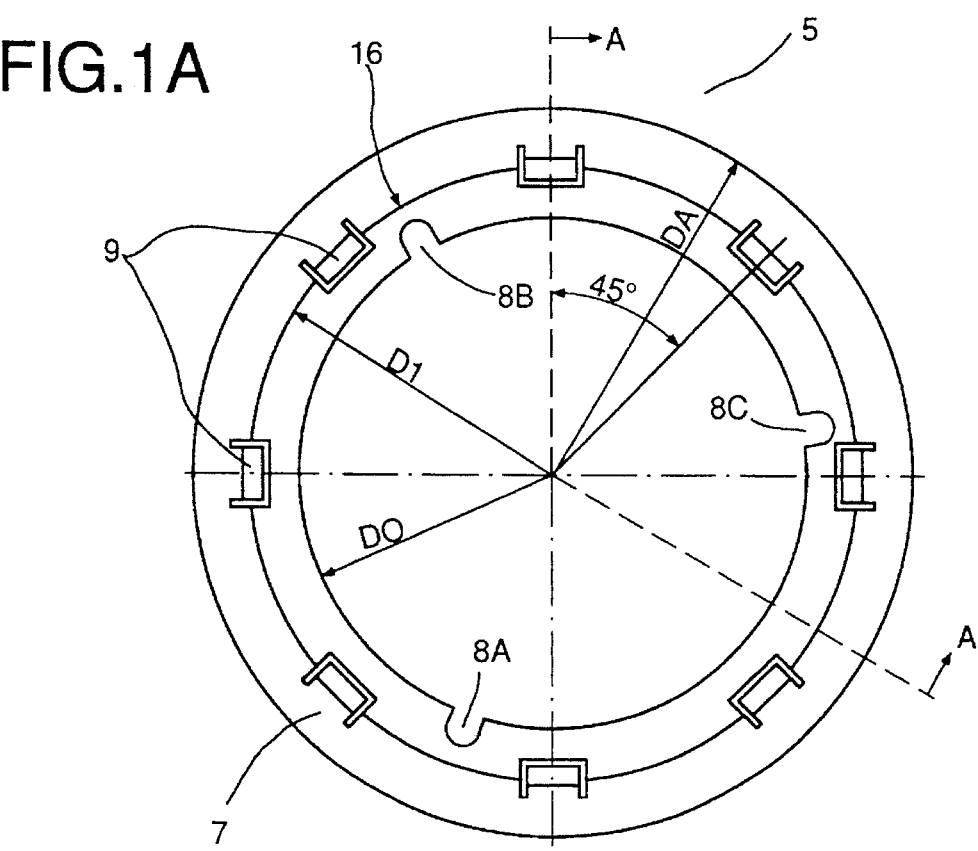
FIG.1A
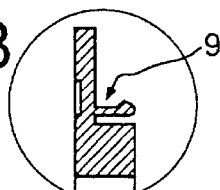
FIG.1B
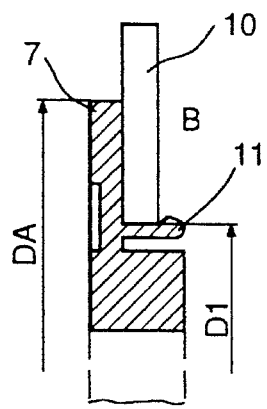
FIG.1D
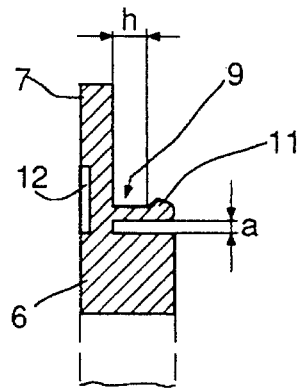
FIG.1C

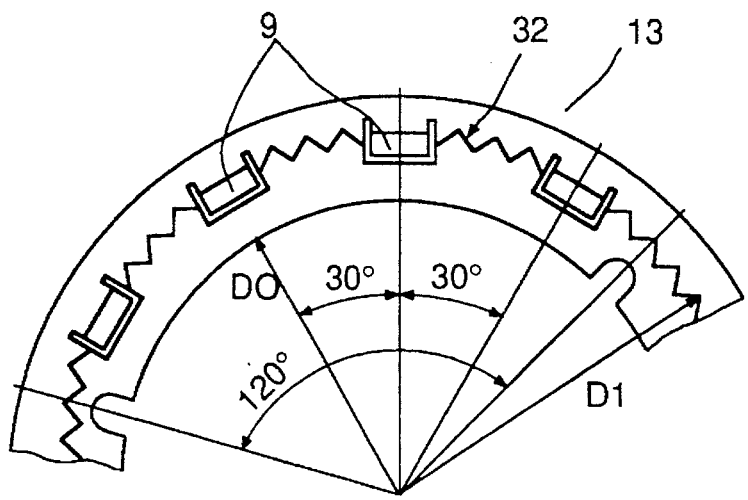
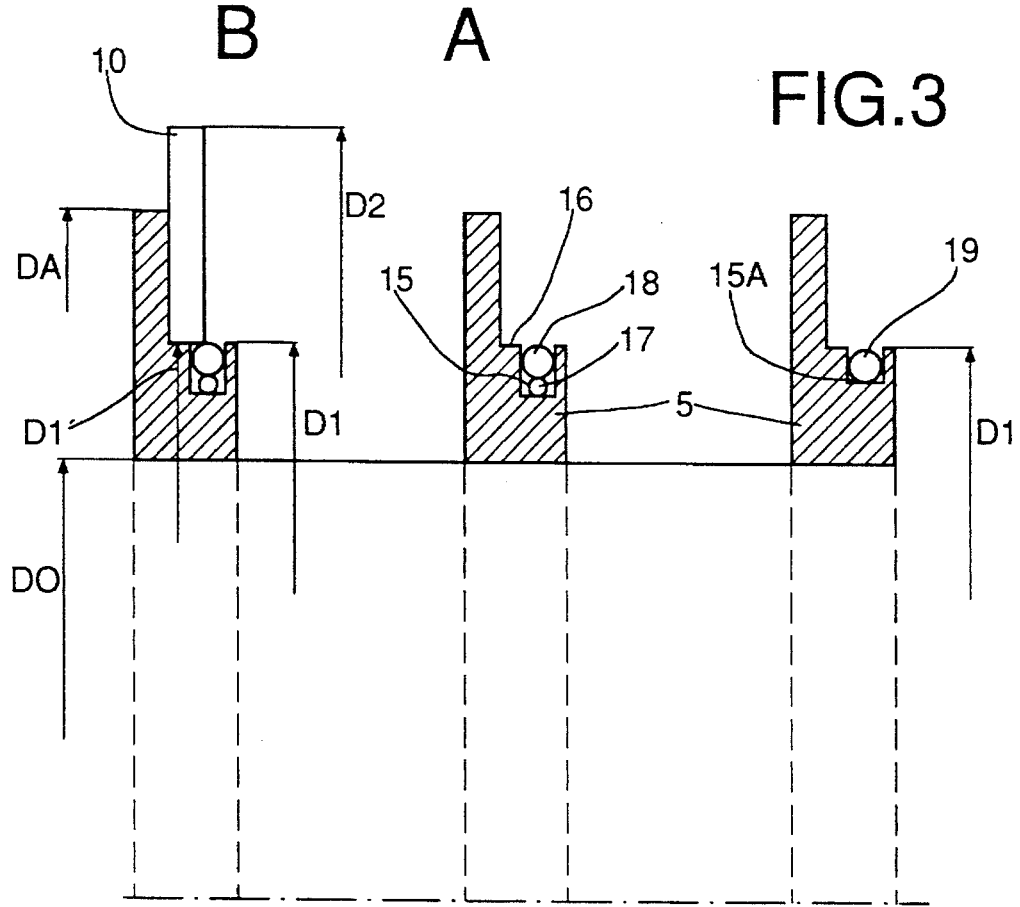

WINDING HUB DEVICE FOR TAPES

The invention relates to a winding hub device for mounting on a winding spindle for individual information carrier tapes to be wound up onto individual winding hubs, having at most two flanges, after the cutting of a wider information carrier web, the winding hub device having spring elements which can be deformed elastically in the radial direction.

The information carrier tapes, for example magnetic tapes, are cut to the width in which they are to be used following coating of a flexible substrate in tape form with a magnetic dispersion and are wound in a length of up to several thousand meters onto winding hubs having at most two flanges. For this purpose, the winding hub is fitted with its central bore onto the winding spindle of a winding machine and the individual information carrier is wound up at high speed and with a correspondingly adapted winding pressure.

Each individual winding hub is mounted axially on the winding spindle for the winding-up operation.

The fitting and removal operations are complex and time-consuming, since they have to be carried out manually. For the user of such rolls of wound-up information carrier tapes, handling is difficult if more than one type of such information carrier tapes, and accordingly different winding hubs, have to be handled.

It is an object of the present invention to provide a winding hub device by means of which manual work is minimized or even able to be automated and by means of which better winding results can be achieved.

We have found that this object is achieved by a winding hub device defined at the beginning if said device comprises two interconnectable parts, an individual winding hub and a ring part, the individual winding hub having a winding surface for the individual information carrier tape and an internal bore and the ring part having an inner circumference for the passage of the winding spindle and a receiving circumference having a surface for entry into the internal bore of the individual winding hub.

In this way it is possible for the individual winding hubs to be able to be fitted onto the winding spindle and secured very simply and easily merely by means of the associated ring part. Furthermore, it is possible to optimize the winding hub device in such a way that, in spite of high tape tension forces and correspondingly high winding pressure, no deformation occurs either to the internal bore of the individual winding hub, which would be disadvantageous for later winding operations, or to the inner circumference of the ring part, which could hinder subsequent fitting onto and pulling off from the winding spindle. In an expedient configuration, the winding hub device may be designed with spring elements which can be deformed elastically in the radial direction.

In a further development of the invention, the individual winding hub may have elastically deformable intermediate elements between the winding surface and the internal bore, which are in particular uniformly distributed over the circumference.

Consequently, it is advantageously possible to avoid permanent deformation both of the individual winding hub and of the associated ring part.

In a further development, the elastically deformable intermediate elements may also be provided on the individual winding hub between penetrations arranged in uniform distribution over the circumference.

The ring part according to the invention may expediently have an annular rim or flange on the ring part body as a bearing rim or side support for the individual winding hub. Each winding hub is consequently given a defined position on the receiving circumference of the associated ring part.

In a further development, catching elements, in particular radially symmetrical toothings, may be provided on the receiving circumferential surface of the ring part and on the circumference of the internal bore of the individual winding hub, in order to achieve a firm force closure and interlocking alignment during the winding operation.

Such a ring part is advantageously able to be produced by injection molding. The ring part may also expediently be provided on the receiving circumferential surface with an annular groove, and at least one ring which is resilient in the radial direction, in particular an O-ring, or a cylindrical spring ring and an O-ring may be provided in the annular groove.

This likewise makes it simple for the ring part to be produced and makes it simple for the winding hub to be fitted.

The following are regarded as further advantages of the winding hub devices according to the invention:

Winding hubs and ring parts may consist of thermoplastic material, which is simple and inexpensive, without glass-fibre or glass-bead inlays.

For adaptation to the winding machine, on the other hand, only a single universal ring part is required as an adaptor for receiving the individual winding hubs. This technique saves plastic, simplifies production and recycling and avoids waste, which is of great advantage ecologically.

A further advantage is simpler and faster handling when fitting or removing the individual winding hubs onto or from the ring part, since there is no longer any need for allocating the engaging bores to be found on existing winding hubs to the adaptation on the winding machines or for the securing of the winding hubs each time a tape is changed. Furthermore, it is of advantage that automation is made simpler by the simple design of the winding hub.

Further advantages are that the ring parts can be fabricated with greater precision, as a result the tapes are adjusted more accurately and the roll of tape runs more smoothly during fast winding, which results in better winding quality and consequently in better running behavior of the roll of tape.

A further advantage is that different tape widths, and consequently different winding hubs, can be wound up using just one ring part. This makes it possible to readjust the processing machines more quickly.

Due to the special design of the winding hub, further aids for stabilizing the roll of tape during transportation can be provided without disturbing the function of the winding hub, for example bores, lugs or similar formations as stacking aids.

Figure 10:
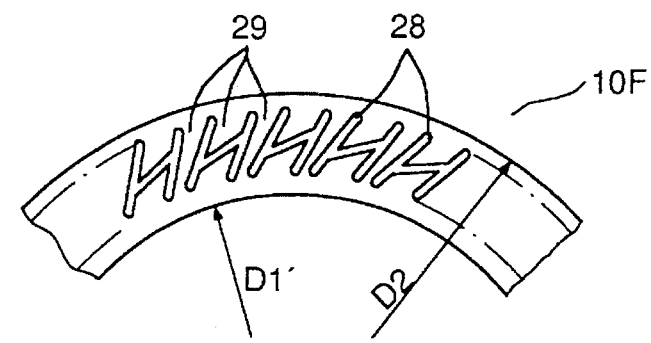
Figure 11:
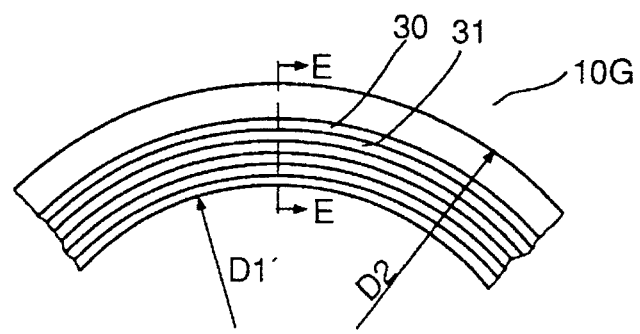
Figure 11A:
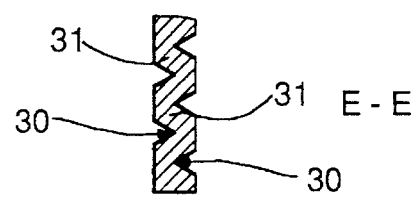
Figure 12:
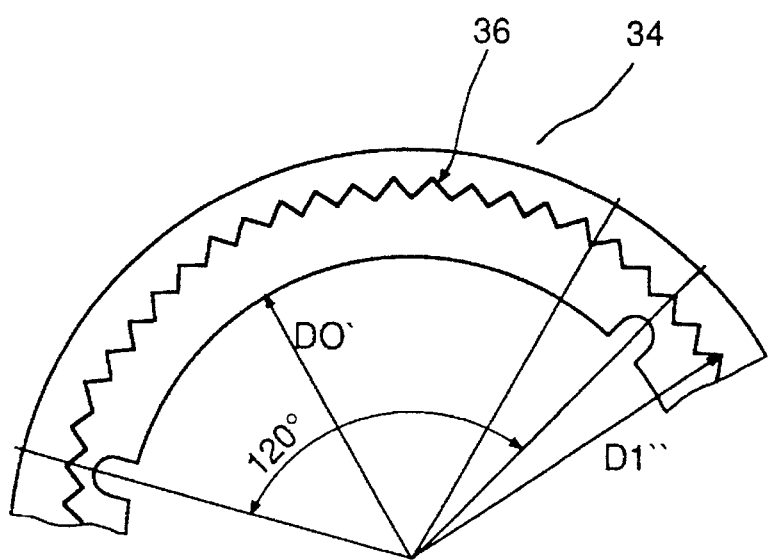
Figure 13:
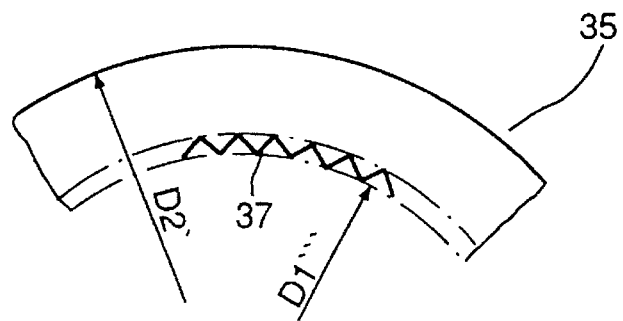

Exemplary embodiments of the winding hub devices according to the invention are described below and are represented in the drawing, in which:

FIGS. 1A–1D show a configuration according to the invention of the ring part with detailed views FIG. 2 shows a further configuration of a ring part FIGS. 3 and 4A and 4B show cross-sectional views with spring elements for winding hub reception FIGS. 5, 7–10 show versions of individual winding hubs with spring elements FIGS. 6, 6A and 11, 11A show further winding hub versions with cross-sectional representations FIGS. 12 and 13 show ring parts with teeth on the receiving circumference.

FIG. 1A shows a ring part 5 with a ring body 6, an inside and outside diameter D0 and D1, respectively, and a flange part 7, formed with the ring body 6, preferably by injection molding, and having the outside diameter DA. The inside diameter D0 corresponds to that of the standardized NARTB hub, and so too do the engaging recesses 8A–8C. With the inside diameter D0, the ring part 5 is fitted onto the winding machine during production of the tape and is later fitted onto the winding device for winding at the customer's premises into cassettes or rewinding.

The outside diameter D1 of the ring body 6 serves for receiving the individual winding hub 10, on which the tape is to be wound up after production and cutting, and is therefore referred to in the following as receiving diameter D1.

Spring elements 9, which are formed by an approximately U-shaped recess on the upper circumferential rim of the ring body 6 and on the flange part 7, are provided on the circumference of the receiving diameter D1. As FIGS. 1B–1D show, hook springs 11 are provided as spring elements 9, said hook springs having an adequate spring excursion a in the radial direction and a receiving groove for the width or height h of the individual winding hub 10 in the axial direction. If the individual winding hub 10 is pushed from the right over the hook springs 11, it comes into its final position FIG. 1D. The spring excursion a is to remain in the elastic range of the material used. The flexibility of the individual hook spring 11 can be set, for example, by means of rear recesses 12. The overall spring force for fitting on/pulling off the individual winding hub 10 can be set by the number of spring elements 9, in FIG. 1A eight spring elements 9 (angular spacing 45°), in FIG. 2 in the case of the ring part 13 twelve spring elements 9 (angular spacing 30°), and by the design in terms of structure and material. The engaging recesses 8A and 8B are better arranged in terms of strength in the case of the ring part 13 in FIG. 2.

In FIGS. 3 and 4, different types of spring elements with a differently shaped ring part 14 are represented.

FIG. 4 shows a ring part 14 with a rectangular groove 15 in the surface 16 on the receiving circumference D1, in which there are located an O-ring 17 for providing the radial spring force and an annularly closed metal-cylinder helical spring 18. The individual winding hub 10 is in turn pushed from the right over the metal-cylinder helical spring 18 and in FIG. 4B is in the desired fitted or tensioned position.

FIG. 3 shows a square cross-section groove 15A with an O-ring 19 as a single spring element as a more simple configuration.

Instead of the annular springs 17–19, of course individual radial spring elements, distributed over the receiving circumference D1, may also be used in bores provided for this purpose but not shown.

FIGS. 5–11 show individual winding hubs which can be used in the way described in the present invention, represented in plan view or plan view section, in some cases in cross-section.

FIG. 5 shows a winding hub 10A with annular form, an internal bore D1' and an outer diameter D2. In this case, the internal bore diameter D1' in the case of the winding hub 10A and each of the hubs of the configurations still to be described is chosen such that the receiving circumference D1 of each ring part fits into the internal bore D1', so that winding hub 10, 10A–10G and ring part 5, 13, 14 form a unit for the respective winding operation. Winding hub and ring part can be fitted on and removed as a structural unit, or the ring parts can also remain fitted on the winding machine, so that only the individual winding hubs have to be fitted on or pulled off.

On the winding devices, for example of the cassette producers, only a few ring parts are necessary, which can be fitted one after the other with the individual winding hubs. The winding hub versions described below, with respect to FIGS. 6–11A, have the advantage that, due to the elastically deformable spring intermediate elements, transmission of the compression from the outer ring (diameter D2) to the internal bore D1' is avoided, so that any deformation of the internal bore is ruled out. Consequently, fitting onto and pulling off from the ring part 10, 13, 14 is always ensured irrespective of the winding pressure. Furthermore, a plastics material without reinforcing fibers, beads etc., can be used, which further reduces the cost of production and contributes to weight saving.

Figure 6:
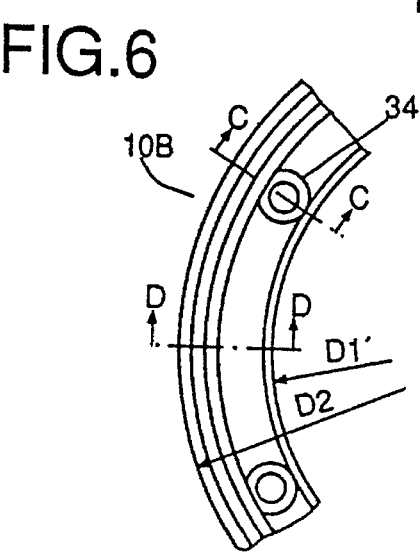
Figure 6A:
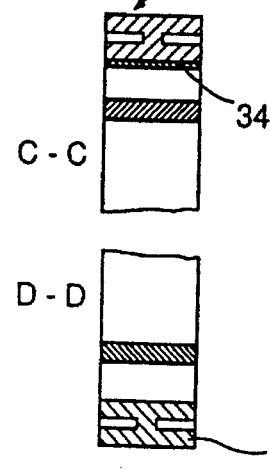
Figure 7:
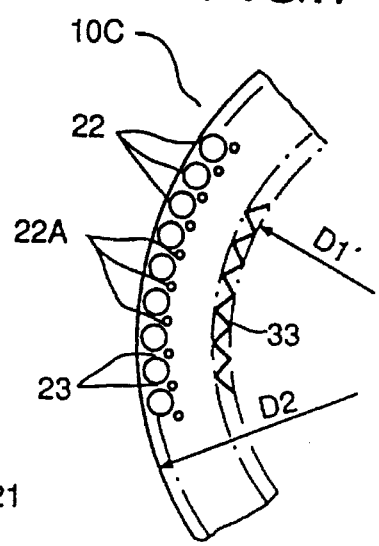

In FIG. 5, the intermediate elements 20 are formed on the winding hub 10A in a meandering shape between penetrations or apertures 20A of an elongate S shape. FIG. 6 shows a winding hub 10B with double-T profile 21 and ring spring elements 34 as intermediate elements in sectional representations (FIG. 6A). The configuration 10C of the winding hub in FIG. 7 is characterized by a number of large and small penetrations 22 and 22A which are arranged in an annular form and between which the spring intermediate elements 23 are located.

Figure 8:
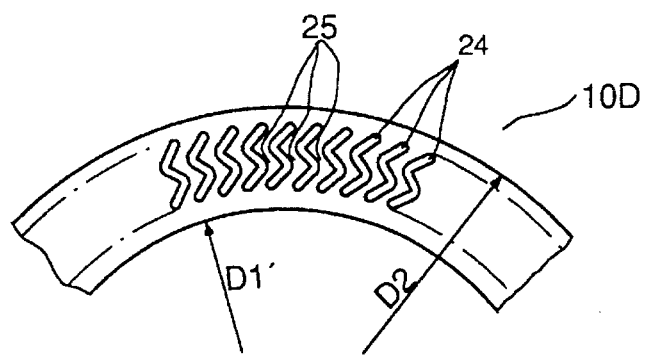
Figure 9:
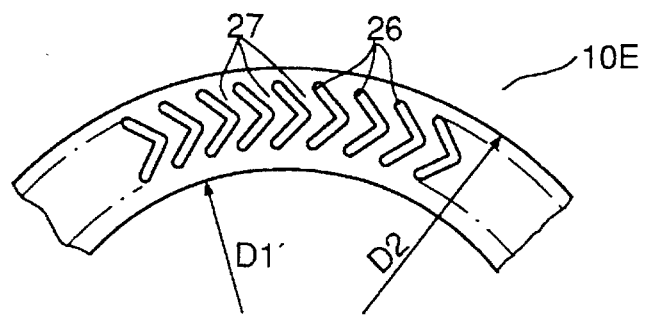

FIG. 8 shows a winding hub 10D with approximately S-shaped apertures 24, between which the spring intermediate elements 25 are formed. FIG. 9 shows a winding hub 10E with arrow-shaped apertures 26 with spring intermediate elements 27. FIG. 10 shows a winding hub 10E with H-shaped apertures 28 with spring intermediate elements 29.

Finally, FIG. 11 shows the winding hub 10G with annular notches 30 and radially effective spring intermediate elements 31 in between.

In FIG. 2, the receiving circumference D1 is provided with an outer toothing 32, which is symmetrical to the radii and is intended to correspond to the inner toothing 33, which is indicated on the inner circumference D1' of the winding hub 10C. The radial symmetry of the toothing is necessary in order that the winding hub can be fitted onto the ring part from either side (axial symmetry).

The thickness dimensions of the ring part 5, 13, 14, 34 and of the winding hub 10, 10A–10G, 35 can be chosen as desired, depending on the tape widths to be wound up. Similarly, the outside diameters DA and D2 or D2' can be selected as desired.

It is, of course, also possible to design the winding hubs 10, 10A–10G, 35 also with stacking protrusions and depressions, provided that this does not affect winding quality.

The combination according to the invention of single-flange ring parts 5, 13, 14, 34 and winding hubs 10, 10A–10G, 35 makes it possible to increase the winding speeds considerably, since a greater winding stability of the winding hubs is achieved. Furthermore, this is also accompanied by an improvement in winding quality, which brings about an advantage when packing and transporting the pancakes if use is made of winding hub widths which correspond very exactly to the tape widths, since said pancakes can be placed directly one on top of the other without intermediate liners in a space-saving way, packed and despatched.

Ring parts and individual winding hubs of the combination according to the invention may expediently consist of any suitable thermoplastic material, for example simple unreinforced polystyrene.

In FIG. 12 a ring part 34 with a toothing 36 on the receiving circumference D1", which is designed without any spring elements, is represented. The associated winding hub 35 is shown as a sector section. The toothings 36 and 37 may correspond in shape to those in FIGS. 2 and 7, but also may be different. It is also possible to use readily elastically resilient materials for ring part 34 and/or 35, provided only that it is ensured that the ring part 34 can in any event be pulled off from the spindle of the winding machine. The scale of FIGS. 12 and 13 is comparatively larger in order to show that the invention can be used to advantage with any diameters of winding spindles and winding hubs. The diameters are denoted by D2', D0', D1" and D1'".

A ring part and winding hub combination comprises a single-flange ring part with spring elements on the receiving circumferential rim for the internal bore of the associated winding hub, which has spring intermediate elements between the internal bore and outer circumference. Receiving circumferential rim and internal bore may expediently be designed with intermeshing toothings.

We claim:

1. A winding hub device for mounting on a winding spindle for individual information carrier tapes to be wound up onto individual winding hubs, having at most two flanges, after the cutting of a wider information carrier web, the winding hub device comprising two interconnectable parts, an individual winding hub and a ring part, the individual winding hub having a winding surface for the individual information carrier tape and an internal bore and the ring part having an inner circumference for the passage of the winding spindle and a receiving circumference with surface for entry into the internal bore of the individual winding hub, wherein a ringform edge is provided on the ring part for side-support of the individual winding hub and, wherein the surface of the receiving circumference of the ring part is provided with recesses at equidistances and hook springs, connected to the said ringform edge, are provided in the recesses as spring elements for receiving the individual winding hub on its internal bore.

2. A winding hub device as claimed in claim 1, which comprises spring elements which can be deformed elastically in the radial direction.

3. A winding hub device as claimed in claim 1, wherein said individual winding hub comprises elastically deformable intermediate elements between the winding surface and the internal bore.

4. A winding hub device as claimed in claim 1 in which said individual winding hub has deformable intermediate elements which are provided in uniform distribution over the circumference between the winding surface and the internal bore.

5. A winding hub device as claimed in claim 4, wherein the elastically deformable intermediate elements are formed between penetrations arranged between the winding surface and the internal bore of the individual winding hub in uniform distribution over its circumference.

6. A ring part as claimed in claim 1 wherein said spring elements are radially elastically deformable.

7. The winding hub device as claimed in claim 1 wherein catch elements are provided on the internal bore of the individual winding hub and on the receiving circumference (D1) of the ring part.

8. The winding hub device as claimed in claim 7, wherein the catch elements are designed as teeth formed symmetrically to the radii.

9. A ring part as claimed in claim 7, wherein the surface of the receiving circumference is provided with an annular groove and at least one ring which is resiliently deformable in the radial direction, is provided in the annular groove.

10. A ring part as claimed in claim 9, wherein the at least one resilient deformable ring is an O-ring.

11. The winding hub device as claimed in claim 1, wherein the individual winding hub is formed with elastically deformable intermediate elements and the ring part is formed with radial spring elements for receiving the individual winding hub.

* * * * *

UNITED STATES PATENT AND TRADEMARK OFFICE
CERTIFICATE OF CORRECTION

PATENT NO.: 5,520,353

DATED: May 28, 1996

INVENTOR(S): BRANDSTETTER et al.

It is certified that error appears in the above-identified patent and that said Letters Patent is hereby corrected as shown below:

On cover page, item [30], "9307867 U" should be -- G 9307867.6--.

On cover page, item [75], "all of Munich" should be --all of Muenchen--.

Signed and Sealed this

Twentieth Day of August, 1996

Attest:

BRUCE LEHMAN

Attesting Officer

Commissioner of Patents and Trademarks